United States Patent [19]
Kathan et al.

[11] Patent Number: 6,145,392
[45] Date of Patent: Nov. 14, 2000

[54] MEASUREMENT DEVICE FOR PROCESS MEASUREMENT ENGINEERING

[75] Inventors: Benno Kathan, Wasserburg; Stefan Kreis, Tettnang; Hans-Peter Müller, Fronraute-Bitzenreute, all of Germany

[73] Assignee: i f m electronic GmbH, Essen, Germany

[21] Appl. No.: 09/261,763

[22] Filed: Mar. 3, 1999

[30] Foreign Application Priority Data

Mar. 3, 1998 [DE] Germany .............. 198 08 878

[51] Int. Cl.$^7$ .................................................. G01N 1/00
[52] U.S. Cl. ........................................................ 73/866.5
[58] Field of Search .............. 73/866.5, 304 R, 73/304 L, 866.3; 374/208, 152, 194, 142; 324/438; 439/296, 312, 320

[56] References Cited

U.S. PATENT DOCUMENTS

| | | | |
|---|---|---|---|
| 3,139,753 | 7/1964 | Brudner | 374/208 |
| 4,260,950 | 4/1981 | Hadden et al. | 324/438 |
| 4,477,132 | 10/1984 | Moser | 439/312 |
| 4,870,863 | 10/1989 | Duncan et al. | |
| 5,454,728 | 10/1995 | Jack | 439/320 |
| 5,456,761 | 10/1995 | Auger et al. | 374/208 |

FOREIGN PATENT DOCUMENTS 196 06 458  8/1997  Germany .

OTHER PUBLICATIONS

Metrastore, Elkutec Electronic GMBH, Messen–Speichern–Übertragen, 1356, Aug. 31, 1992.

*Primary Examiner*—Robert Raevis
*Attorney, Agent, or Firm*—Nixon Peabody LLP; David S. Safran

[57] ABSTRACT

A measurement device for process measurement engineering with a measurement unit (2) and an evaluation device (3), the measurement unit (2) having a sensor, especially a temperature sensor, and the evaluation device (3) containing at least most of the electrical and electronic components and having a display and/or an adjustment capability. The number of types of measurement devices required to be maintained can be reduced and their possible applications increased by the measurement device (1) being modular and the measurement unit (2) and the evaluation device (3) being detachably interconnected both electrically and mechanically via standardized interfaces.

21 Claims, 7 Drawing Sheets

MEASUREMENT DEVICE FOR PROCESS MEASUREMENT ENGINEERING

BACKGROUND OF THE INVENTION

1. Field of the Invention

The invention relates to a measurement device for process measurement engineering, especially a temperature measurement device, with a measurement unit and an evaluation device, the measurement unit having a sensor, especially a temperature sensor, and the evaluation device containing at least a large part of the electrical and electronic components and having a display and/or an adjustment capability.

2. Description of Related Art

There are a host of applications for measurement devices for process measurement engineering. Thus, for example, the temperature, the fill level, the flow speed or the flow quantity of liquid or solid media, but also of bulk material, can be monitored or measured. Thus, in turn, there are different measurement principles for determining the individual parameters. For example, the fill level of a liquid can be determined by ultrasound, radar or guided microwaves. The individual measurement methods have different advantages and disadvantages depending on the application. To meet the partially very different requirements of the individual users, a very great diversity of types of measurement devices is thus necessary; due to the small number of items and high storage costs, this leads to a high final price of the measurement devices. The diversity of types is further increased by there being, on the one hand, so-called compact devices, in which the measurement unit and the evaluation device are accommodated jointly in a housing, and on the other hand, those measurement devices in which the evaluation device is spatially separated from the measurement unit and is connected to it via a connecting cable.

In the so-called compact devices, it is a disadvantage that the entire measurement device must be replaced when there is a defect in it. In addition to increased costs, this can lead to longer down times in the course of the process. The use of connecting cables between the measurement device and the evaluation device has the defect that the lower mechanical load capacity and stability of the connecting cable leads to problems for certain applications. As a result, a manufacturer of measurement devices is forced to produce a very large number of different measurement devices with different construction forms and also to warehouse them.

SUMMARY OF THE INVENTION

Thus, primary objects of this invention are, on the one hand, to reduce the diversity of types of measurement devices, and on the other hand, at the same time, to increase the possible applications of the measurement devices.

The aforementioned objects are achieved in measurement device of the type initially described by, first of all, the measurement device being made modular and the measurement unit and the evaluation device being detachably interconnected both electrically and mechanically via standardized interfaces.

Due to the modular structure of the measurement device in conjunction with standardized interfaces, it is possible to combine different measurement units with different evaluation devices so that, while the diversity of types of individual components is reduced, there is an increase in the possible applications for measurement devices according to the invention. In this way, the requirements of the user can be considered to an increased degree, it is possible to react more quickly to wishes for modifications, and a defective measurement device can be replaced or repaired more rapidly and easily.

The measurement device according to the invention is made especially advantageously by the measurement unit and the evaluation device being interconnectable both directly and also via a connecting cable. In this way, the combination possibility which is optimum for the respective application can be sought without the need to develop special measurement devices for this purpose. For the manufacturer and also the user of the measurement devices according the invention, this means that this same measurement unit and the same evaluation device can be connected both via a rigid mechanical coupling and also via a flexible connecting cable. Thus, for the manufacturer, the diversity of types is further reduced and the user can more easily adapt an existing device to altered applications.

According to one preferred embodiment of the invention, the evaluation device is made in two parts, the lower part having the interface for connection to the measurement unit and the upper part containing the display and adjustment capability. In this way, flexibility is further increased and replacement of a defective evaluation device is further facilitated.

The invention can be used to special advantage in measurement devices in which a measurement tube is inserted into a container or a line, and thus, the temperature, the fill level, the flow speed, or the flow quantity of a liquid or gaseous medium located in the container or in the line is measured or monitored. Thus, the invention can be used to special advantage, for example, in temperature measurement devices and in fill level or flow measurement devices. In these measurement devices, then, the evaluation device is located outside the container or the line and the measurement device has a preferably cylindrical measurement tube with a sensor located within the measurement tube. In the measurement device in accordance with the invention, the measurement tube, in the connecting area, has a stop collar and an outside thread as the mechanical interface and a mounting plug as the electrical interface.

In particular, there are a host of possibilities for embodying and developing the measurement device in accordance with the invention, as will become apparent from the following description of the preferred embodiments when considered in conjunction with the drawings.

DETAILED DESCRIPTION OF THE INVENTION

Figure 1:
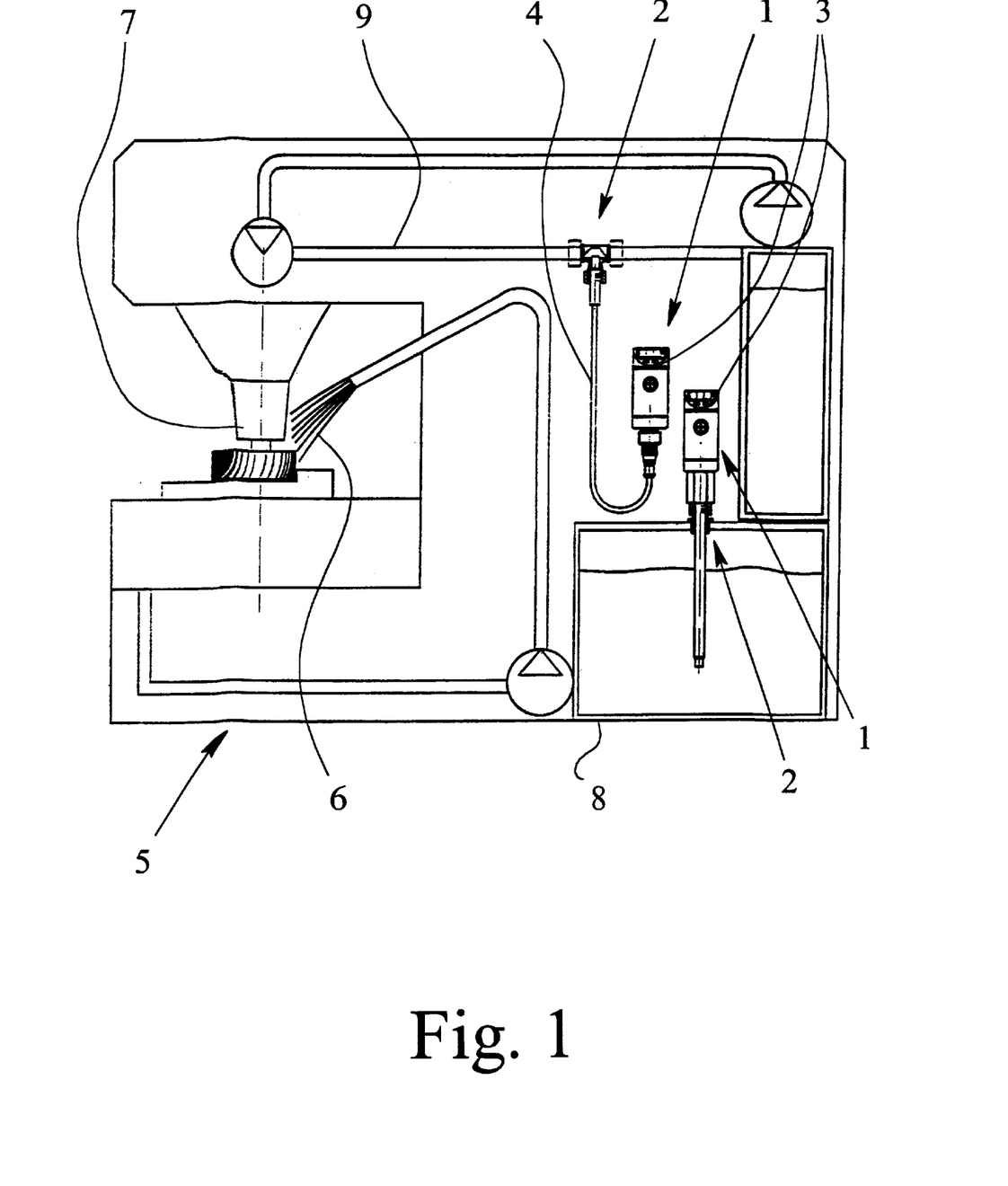
FIG. 1 shows a schematic of a machine tool as an example of an application for the measurement devices in accordance with the invention.

FIG. 1 shows an application for the embodiments of the measurement device 1 according to the invention, the measurement device being comprised of a measurement unit 2 and evaluation device 3. The measurement unit 2 and evaluation device 3 can be interconnected either directly or via a connecting cable 4.

The application shown in FIG. 1 is machine tool 5, in which the coolant 6 for a milling device 7 is monitored. To do this, both the fill level of the coolant 6 in a storage tank 8 and also the flow velocity of the coolant 6 in a pipeline 9 are monitored. In FIG. 1, it is easily apparent that the measurement device 1 in accordance with the invention can be optimally adapted to the respective application by the possibility of the individual modules being variously combined with one another. Thus—at least by the housing—the identical evaluation device 3 is connected to two different measurement units 2. In addition, the connection of the measurement unit 2 and evaluation device 3 is accomplished in different ways; on the one hand, by a direct mechanically stable connection, and on the other, via a flexible connecting cable. Thus, the sensor used in the measurement unit 2 for the storage tank 8 is a fill level sensor directly connected to its measurement unit 2, and on the other hand, the sensor 2 used for flow line 9 is a flow monitor connected by a cable 4 to its evaluation device 3. Likewise, the temperature or amount of flow of coolant 6 can be checked. Also, the sensor used in the measurement unit 2 can use different measurement principles, thus, for example, the fill level of a liquid can be determined, for example, by means of ultrasound, radar or guided microwaves. Likewise, fill level monitoring with a capacitive sensor is possible.

Figure 2:
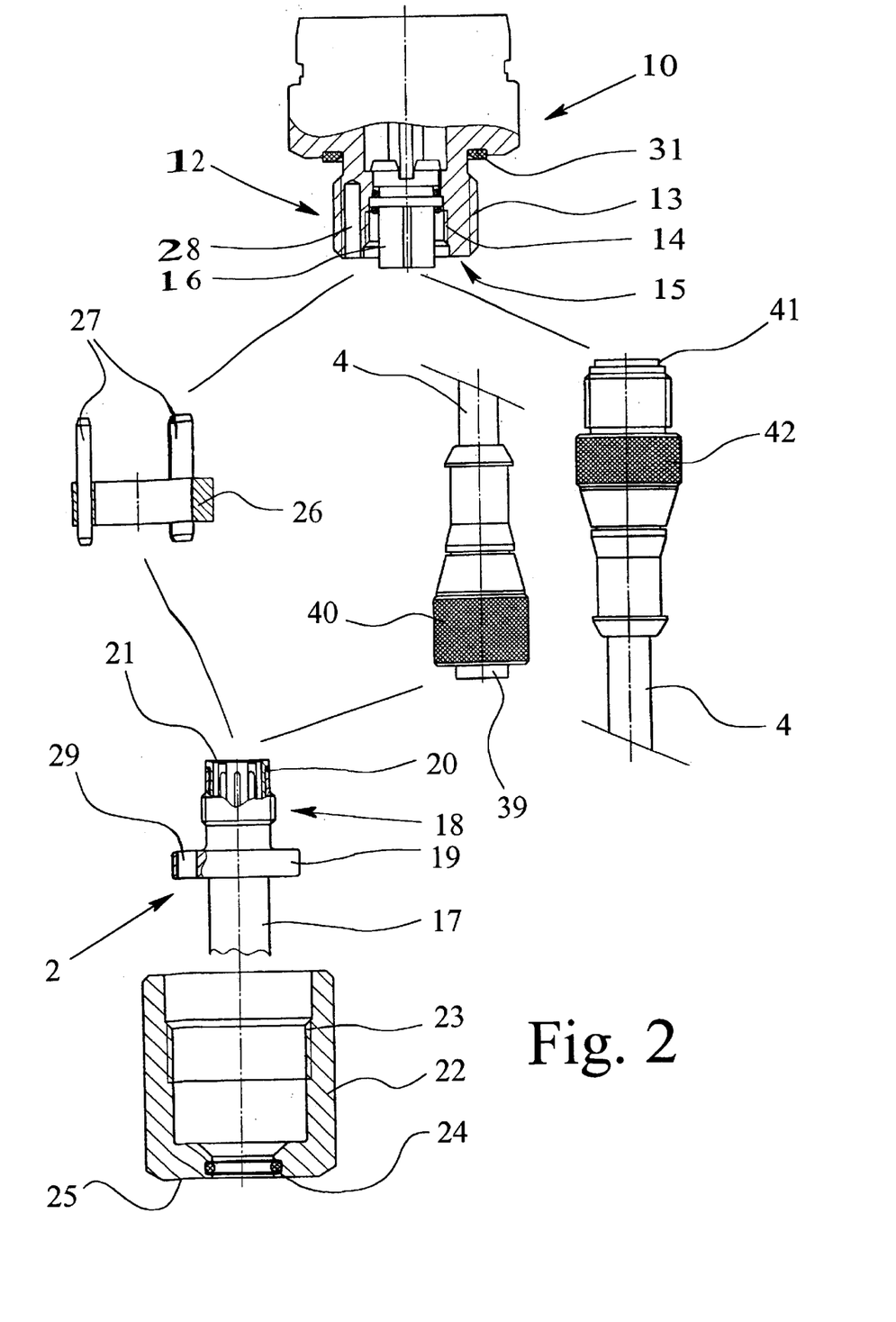
FIG. 2 shows individual modules of the measurement devices in accordance with the invention, partially in section.
Figure 3:
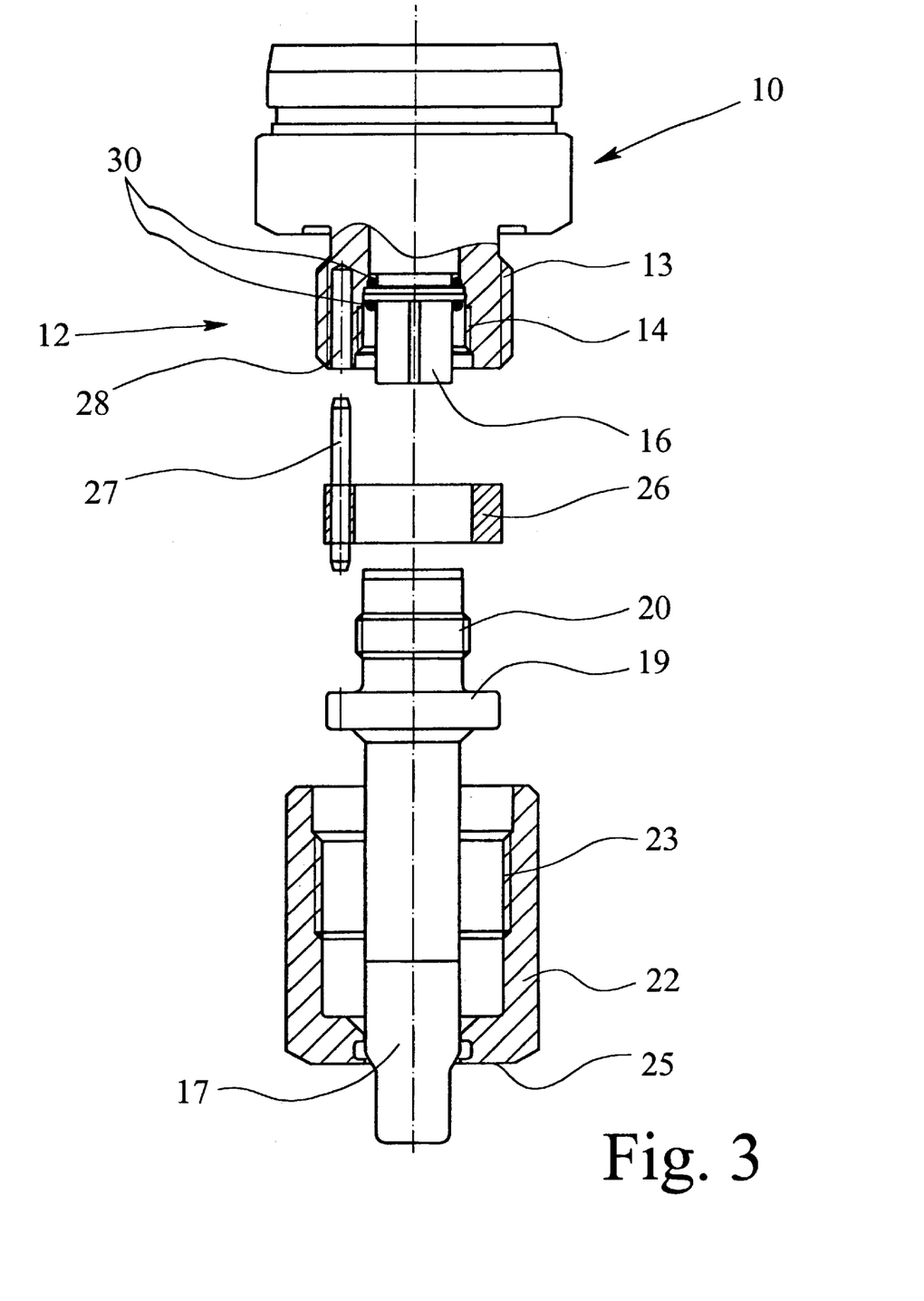
FIG. 3 is an exploded view of the modules used in the direct connection of the measurement unit and the evaluation device.
Figure 4:
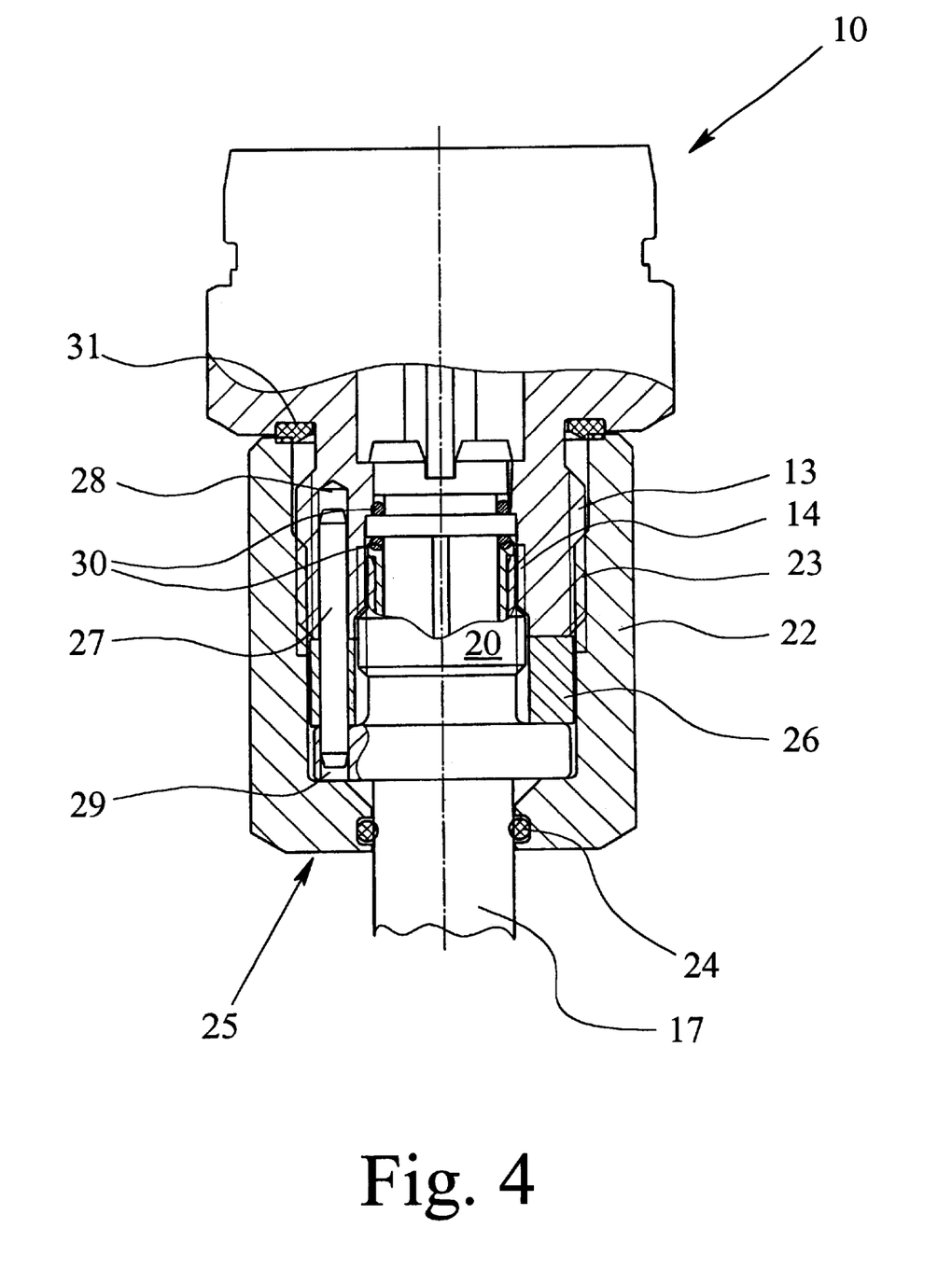
FIG. 4 shows the modules of FIG. 3 in their connected state.

FIGS. 2 to 4 show only the lower part 10 of the evaluation device 3, but not the upper part 11 also shown in FIGS. 1, 5, 6 and 7. The lower part 10 of the evaluation device 3 shown in FIGS. 2–4 has an outside thread 13 and an inside thread 14 in its lower area 12. The outside thread 13 and inside thread 14 of the lower part 10 are used as a mechanical interface to the measurement unit 2. On the bottom 15 of the lower part 10 there is a socket 16 which is used as the electrical interface to the measurement unit 2.

The measurement unit 2 is essentially rotationally symmetrical and comprises a cylindrical measurement tube 17 and a sensor located within the measurement tube 17. In addition to the sensor, part of or all the sensor electronics can be located in the measurement tube 17. The measurement tube typically has a diameter of less 20 mm, preferably less than or equal to 13 mm, and can have a length, for example, in temperature measurement elements, of 15–50 cm. To connect the measurement unit 2 to the evaluation device 3, the measurement tube 17 has a connecting area 18 on which a stop collar 19 and an outside thread 20 are provided as the mechanical interface. A mounting plug 21, located in the connection area 18, is used as the electrical interface between the measurement unit 2 and the sensor located in the measurement tube 17, and the evaluation device 3.

FIGS. 3 & 4 show the modules used in the direct connection of the measurement unit 2 and the evaluation device 3, in the unconnected state in FIG. 3 and in the connected state in FIG. 4. The mechanical connection of the measurement unit 2 and evaluation device 3 is effected by a union nut 22 which is made as a hexagon and which has relatively large dimensions, preferably a jaw size SW 27. This yields, overall, a very stable mechanical unit so that measurement devices 1 connected in this way can be used even under high mechanical load. The union nut 22 has an inside thread 23 which corresponds to the outside thread 13 of the lower part 10 and is guided axially on the measurement tube 17, for which it has an O-ring 24 in its end 25 facing away from the bottom 15 of the lower part 10. If, at this point, the union nut 22 is screwed onto the outside thread 13 of the lower part 10, the stop collar 19 is used as an abutment for the end 25 of the union nut 22.

In principle, but not shown here, instead of the connection of the measurement unit 2 and evaluation device 3 by means of the union nut 22, a connection as in a round connector with screw locking and at least one axially movable threaded sleeve is possible. Compared to the preferred embodiment with the union nut 22, the mechanical loading capacity of this connection of the measurement unit 2 and the evaluation device 3 is however less.

As FIGS. 3 & 4 show, according to one preferred embodiment of the invention, a spacer ring 26 is used which, in the assembled state of the measurement device 1, is located between the bottom 15 of the lower part 10 and the stop collar 19. The spacer ring 26 ensures that the mechanical stress of the electrical plug-and-socket connection between the measurement unit 2 and evaluation device 3, i.e. between the mounting plug 21 and the receptacle 16, is low. The spacer ring 26 has two pins 27 which fit into the corresponding holes 28 in the bottom 15 of the lower part 10 or into corresponding holes 29 in the stop collar 19. In this way, when the union nut 22 is tightened, effective protection of the electrical plug-and-socket connection between the measurement unit 2 and evaluation device 3 against rotation is ensured. In the area of the receptacle 16 which is generally made with 5 pins, but which however can also be made with 8 pins, there are two eye rings 30 which, like the sealing ring 31, ensure a reliable and tight connection between the measurement unit 2 and the evaluation device 3.

In FIG. 2, the lines show how, on the one hand, the evaluation device 3 can be connected via the spacer ring 26 directly to the measurement unit 2, and on the other hand, can also be connected via the connecting cable 4 to the measurement unit 2.

Figure 5:
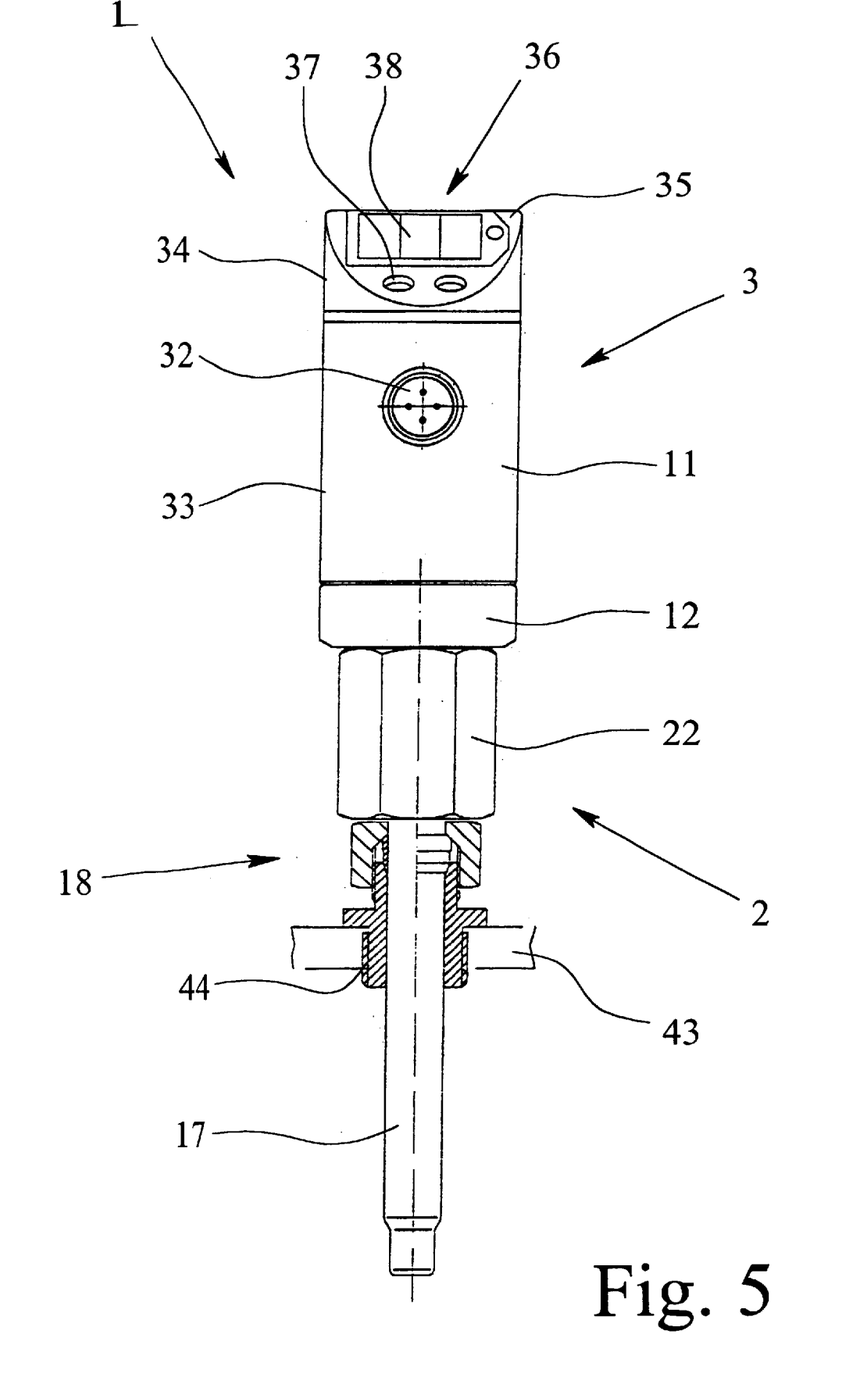
FIG. 5 shows an embodiment of a measurement device according to the invention with direct connection of the measurement unit and evaluation device.
Figure 6:
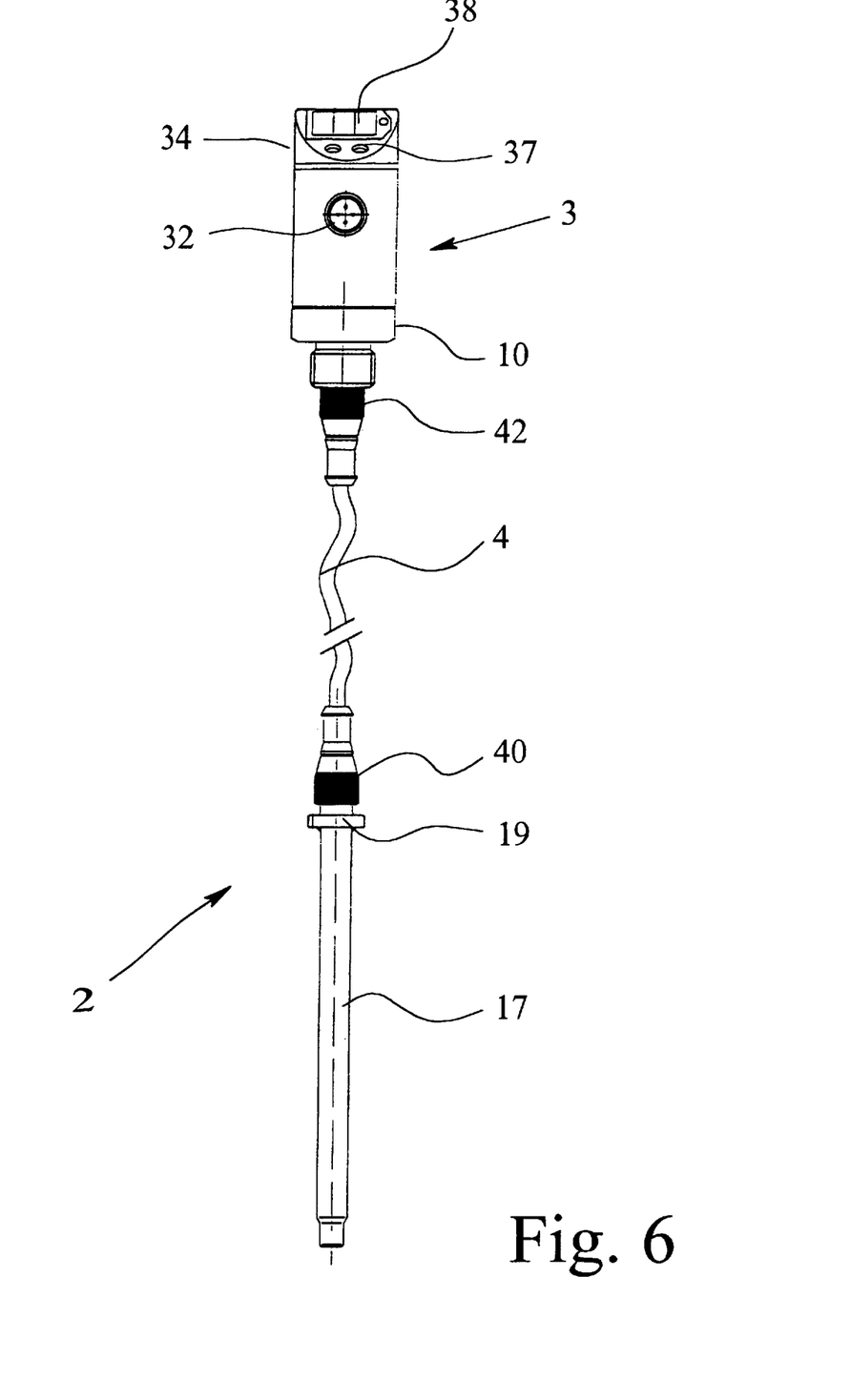
FIG. 6 shows a first embodiment of a measurement device in accordance with the invention with a connecting cable.
Figure 7:
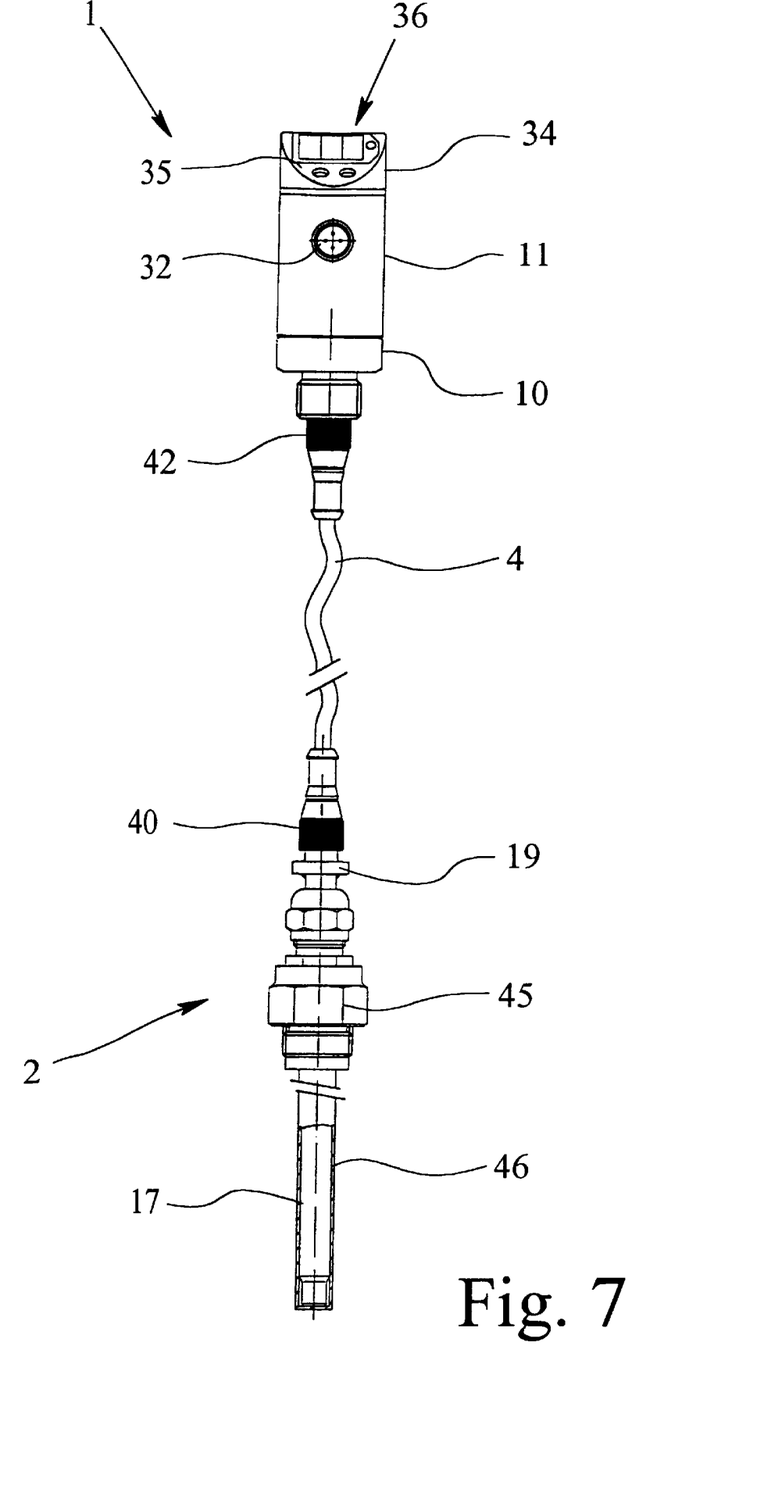
FIG. 7 shows a second embodiment of a measurement device according to the invention with a connecting cable.

FIGS. 5–7 each show complete measurement devices 1, i.e., in addition to the measurement unit 2, both the lower part 10 and also the upper part 11 of the evaluation device 3 are shown. In all three figures, the evaluation device 3 has a second interface which is located in the upper part 11 and which has either two switching outputs or one switching output and one analog output or input. The interface is thus used as the control signal output and/or as the power supply voltage input. In battery-operated devices, the second interface can either be omitted or can also be used a programming interface. The interface is advantageously made as a plug 32 of the same type as the receptacle 16 of the lower part 10. The plug 32 is located laterally on the upper part 11 which is formed of a sleeve 33 and a cover 34 located on the end of the upper part 11. Advantageously, the sleeve 33 is made of metal, preferably high quality steel, and the cover 34 is made of plastic. The cover 34 has a bevel 35 which extends over half of the end and has an angle of inclination of roughly 45°. In the bevel 35 is a display and operating panel 36 which has several keys 37, preferably multifunction setting keys, and a LED display 38 with preferably three 7 segment LED elements. The upper part 11 is cylindrical in shape, with a length of 60–150 mm, preferably 80–110 mm, and with a diameter of 25–90 mm, preferably 34 mm. The connection of the upper part 11 and the lower part 10 takes place preferably via an elastic press fit, as is described in the commonly assigned, co-pending U.S. patent application Ser.

No. 09/147,664. Alternatively, the upper part 11 can also be fixed to rotate axially in the lower part 10, for which reference is made to published German Patent Application 196 16 658. This axially rotary connection of the upper part 11 and the lower part 10 is especially advantageous, when a flowmeter is used, to enable optimum adjustability of the sensor with respect to the flow direction.

While, in FIG. 5, an embodiment of a measurement device 1 in accordance with the invention is shown with a direct connection of the measurement unit 2 and evaluation device 3, FIGS. 6 & 7 each show an embodiment of a measurement device 1 in which the measurement unit 2 and the evaluation device 3 are interconnected via a connecting cable 4. Preferably, a standard connecting cable with optional length and circular plug-and-socket connections is used as the connecting cable 4. An especially suitable connecting cable 4 is described in German Patent 42 05 440. One such connecting cable 4 has a receptacle 39 with an axially movable union nut 40, and a plug 41 with a likewise axially movable threaded sleeve 42, as is shown in FIG. 2.

The attachment of the measurement unit 2 and the measurement tube 17 in a container wall 43 or in a pipeline can be achieved, for example, via a cutting ring screw connection 44 as shown in FIG. 5, or via a sliding coupler 45 according to FIG. 7. The advantage of the sliding coupler 45 is the possibility of being able to continuously vary the immersion depth of the measurement tube 17 into the container. The measurement tube 17 can be inserted into the container either directly or in an additional immersion tube 46.

Advantageously, for all electrical interfaces, therefore, for the receptacle 16, the mounting plug 21, the plug 32 and the connecting cable 4, commercial round plugs or round receptacles are used, conventional M12 circular connectors, or also M8 circular connectors or other sizes can be used.

We claim:

1. Measurement device for process measurement engineering comprising a measurement unit and an evaluation device, the measurement unit having a sensor, and the evaluation device containing electrical and electronic components and having at least one of a display and a programming capability; wherein the measurement device is of a modular construction; wherein the measurement unit and the evaluation device are detachably interconnected both electrically and mechanically via a standardized interface; wherein the measurement unit and the evaluation device are interchangeably detachably interconnectable directly and via a connecting cable; and wherein the evaluation device is made in two parts, with a lower part and an upper part, the lower part having an interface for connection to the measurement unit and the upper part containing display and programming components.

2. Measurement device as claimed in claim 1, wherein the sensor is a temperature sensor.

3. Measurement device as claimed in claim 1, in which the connecting cable for interconnecting the measurement unit and the evaluation device has a receptacle with an axially movable union nut and a plug with an axially movable threaded sleeve.

4. Measurement device as claimed in claim 1, wherein the upper part of the evaluation device is rotationally symmetrical, has a metallic sleeve and on the upper end has a cover with a bevel, a display and operating panel being provided in the bevel.

5. Measurement device as claimed in claim 4, wherein the display and operating panel has at least one key and an LED display.

6. Measurement device as claimed in claim 1, wherein the lower part and the upper part of the evaluation device are interconnected via an elastic press fit and an upper area of the lower part is hexagonal.

7. Measurement device as claimed in claim 1, wherein a lower end of the lower part of the evaluation device has an outside thread and an inside thread as a mechanical interface.

8. Measurement device as claimed in claim 7, in which the measurement unit and the evaluation device are directly interconnected; wherein a mechanical connection of the measurement unit and the evaluation device is comprised of a union nut on the measurement unit which has an inside thread which corresponds to the outside thread of the lower part of the evaluation device.

9. Measurement device as claimed in claim 8, wherein the union nut is guided axially on the measurement tube and a stop collar is provided as an abutment when the union nut is tightened.

10. Measurement device as claimed in claim 9, wherein a separate spacer ring is located between the stop collar and a bottom of the lower part of the evaluation device.

11. Measurement device as claimed in claim 10, wherein the spacer ring has at least two pins and there are at least two corresponding holes in the bottom of the lower part and the stop collar.

12. Measurement device as claimed in claim 7, wherein a lower end of the lower part of the evaluation device has a receptacle as an electrical interface.

13. Measurement device as claimed in claim 12, wherein the evaluation device has a second electrical interface in an upper part thereof, the second interface having two switching outputs.

14. Measurement device as claimed in claim 12, wherein the evaluation device has a second electrical interface in an upper part thereof, the second interface having a switching output and an analog output or input.

15. Measurement device as claimed in claim 12, wherein the evaluation device has a second electrical interface in a lateral area of an upper part thereof; and wherein the second electrical interface is made as a plug of the same type as the receptacle of the lower part.

16. Measurement device as claimed in claim 1, wherein a lower end of the lower part of the evaluation device has a receptacle as an electrical interface.

17. Measurement device as claimed in claim 1, wherein the measurement unit is essentially rotationally symmetrical and has a cylindrical measurement tube with a sensor located within the measurement tube.

18. Measurement device as claimed in claim 17, wherein the measurement tube has a connection area with a stop collar and an outside thread as a mechanical interface.

19. Measurement device as claimed in claim 18, wherein the measurement tube has a mounting in the connection area as an electrical interface.

20. Measurement device as claimed in claim 19, wherein the evaluation device has a second electrical interface in an upper part thereof, the second interface having two switching outputs.

21. Measurement device as claimed in claim 19, wherein the evaluation device has a second electrical interface in an upper part thereof, the second interface having a switching output and an analog output or input.

* * * * *